June 17, 1952  D. V. GALLERY, JR  2,600,400
GUN SIGHT
Filed April 23, 1941  2 SHEETS—SHEET 2

Three Dimensional Cam Method

Sine Cam Method

Log Cam Method

INVENTOR
Daniel V. Gallery Jr.
BY
ATTORNEY

Patented June 17, 1952

2,600,400

UNITED STATES PATENT OFFICE 2,600,400

GUN SIGHT

Daniel V. Gallery, Jr., United States Navy

Application April 23, 1941, Serial No. 389,844

2 Claims. (Cl. 33—49)

(Granted under the act of March 3, 1883, as amended April 30, 1928; 370 O. G. 757)

This invention relates to automatically compensating gun sights for flexibly mounted aerial machine guns, and more particularly to the type of compensating gun sight described and claimed in my co-pending application, Serial No. 386,090, for U. S. Letters Patent, filed March 31, 1941, now Patent 2,534,258 granted December 19, 1950.

It is an object of this invention to provide a new and useful means for introducing a correction into one of the two sighting elements of an aircraft machine gun in order to compensate for the effect of the firing aircraft's air speed on the initial velocity and trajectory of the bullet. To accomplish this object, I have provided a new and useful means for offsetting one of the two sighting elements so that the line of sight established by these elements will form an angle with the bore of the gun when the gun is trained and elevated at an angle relative to the fore and aft axis of the aircraft.

The angle formed by the line of the sight and the axis of the bore of the gun may be defined in terms of two angles, each formed by projecting the line of sight and the axis of the bore upon two planes intersecting at right angles. One of the planes contains the athwartship and longitudinal axis of the aircraft and is hereinafter referred to as the horizontal reference plane; the other plane contains the longitudinal axis of the aircraft and is hereinafter referred to as the vertical reference plane. The magnitude of the angle formed by the line of sight and the axis of the bore of the gun is dependent upon the air speed of the firing aircraft and also upon the angle of elevation and train of the gun relative to the longitudinal axis of said aircraft.

For the purpose of this disclosure it will be assumed that during firing the aircraft is flying at a constant speed and that the sighting members are properly spaced for the known airspeed of the firing aircraft. If the axis of the bore of the gun is parallel to the plane of the longitudinal and athwartship axis of the aircraft, which is the position of zero elevation, the effect of the airspeed of the moving aircraft on the trajectory of the bullet will change as the gun is moved in train about its azimuthal axis. For the position of zero train the axis of the bore of the gun will be parallel to the longitudinal or fore and aft axis of the aircraft, and the muzzle of the gun will be pointed in the direction of flight. In this position the airspeed of the firing aircraft would be added directly to the muzzle velocity of the bullet and would cause no distortion in the bullet's normal trajectory. Consequently no correction would be applied to the sights to compensate for the effect of the airspeed, because in the ranges over which these sights are effective the trajectory is substantially flat.

If, however, the gun is trained at an angle to the fore and aft axis of the aircraft, then the effect of the firing aircraft's airspeed on the velocity and trajectory of the bullet may be determined by resolving the airspeed vector into components, one of which is parallel to the axis of the bore of the gun and equal to the airspeed multiplied by the cosine of the angle of train; the other of which is normal to the axis of the bore of the gun and equal to the airspeed multiplied by the sine of the angle of train. The component which is normal to the axis of the bore of the gun when acting upon the bullet in flight will deflect it from its normal trajectory along a resultant path. The magnitude of the deflection will, of course, be dependent upon the airspeed and the angle of train. The direction of the resultant path of the bullet may be defined in terms of the angle between this resultant path and the normal trajectory which would be in line with the axis of the bore. This angle, which I have indicated as $\phi t$, may be termed the angle of deflection in train and is equal to $$\tan^{-1} \frac{Va \sin \alpha t}{Vg + Va \cos \alpha t}$$

wherein $Va$ is the airspeed of the firing aircraft, $\alpha t$ is the angle of train, and $Vg$ is the muzzle velocity of the bullet. It is apparent from the above equation that the magnitude of the angle of deflection in train $\phi t$ will change as the angle of train is varied, for example, if the angle of train is zero the angle of deflection in train will equal $$\tan^{-1} \frac{Va \sin 0}{Vg + Va \cos 0}$$

or zero deflection.

If, however, the angle of train is 90°, the angle of deflection in train $\phi t$ is equal to $$\tan^{-1} \frac{Va \sin 90}{Vg + Va \cos 90}$$

which is the maximum angle of deflection.

It is thus noted that the magnitude of the angle of deflection in train $\phi t$ varies from zero at an angle of train equal to zero to a maximum value at angle of train equal to 90°; to zero again when the angle of train is 180°, and maximum again for an angle of train which is equal to 270°. Therefore, in order to correct for this angle of deflection, I propose to offset the axis of the bore of the gun from the line of sight by an equivalent angle of moving one of two sighting members in a path parallel to the horizontal reference plane and in a direction perpendicular to the axis of the bore. It is apparent that if the sine function of the angle of train $at$ is applied to one of the sight elements the angular offset formed by the two sighting elements would be correct for all angles of train.

Corrections must also be introduced into the sight angle to compensate for the effect of the firing aircraft's airspeed on the velocity and trajectory of the bullet for different angles of elevation of the gun. Consider, for example, that the gun is in a position of zero train but elevated at an angle $ae$. The angle of deflection in elevation $\phi e$ which is the vertical angle between the resultant path of the bullet and the axis of the bore, (or the angle which is formed between the resultant trajectory and the axis of the bore when projected upon the vertical reference plane) is equal to $$\tan^{-1} \frac{Va \sin ae}{Vg + Va \cos ae}$$

It is apparent from the equation that as the angle of elevation is changed with the gun remaining at zero angle of train, the correction which should be introduced into the sighting element would vary as a function of the sine of the angle of elevation $ae$. This correction is, however, influenced by different angles of train. For an angle of train other than zero the component of the firing aircraft's airspeed in the plane normal to the horizontal reference plane containing the axis of the bore, is equal to the airspeed multiplied by the cosine of the angle of train ($Va \cos at$). It is this component of velocity which when acting upon the bullet in flight produces the vertical offset, because the vertical projection of the resultant velocity is equal to the vector sum of $Vg$ and $Va \cos at$. Therefore, for all angles of elevation and train the angle of deflection in elevation $\phi e$ is equal to $$\tan^{-1} \frac{Va \cos at \sin ae}{Vg + Va \cos at \cos ae}$$

If it is considered that $ae$ remains fixed as the gun is moved in train, $\phi e$ will vary to a maximum value when $at$ is zero, to zero when $at$ is 90°; maximum again when $at$ is 180°, and to zero again when $at$ equals 270°. Thus, in order to correct for the angle of deflection in elevation $\phi e$ one of the sight elements must be moved in a path parallel to the vertical reference plane and perpendicular to the axis of the bore an amount which is a function of the product of the sine of the angle of elevation and the cosine of the angle of train.

It is, therefore, a specific object of this invention to provide a means for moving one of two sighting elements in a path parallel to the horizontal reference plane and normal to the axis of the bore an amount which is a function of the sine of angle of train, and for moving the same sighting element in a path parallel to the vertical reference plane and normal to the axis of the bore of the gun an amount which is a function of the product of the sine of the angle of elevation and the cosine of the angle of train.

With the foregoing and other objects in view, the invention consists in the construction, combination and arrangement of parts hereinafter described and illustrated in the drawings, in which.

Figure 1:
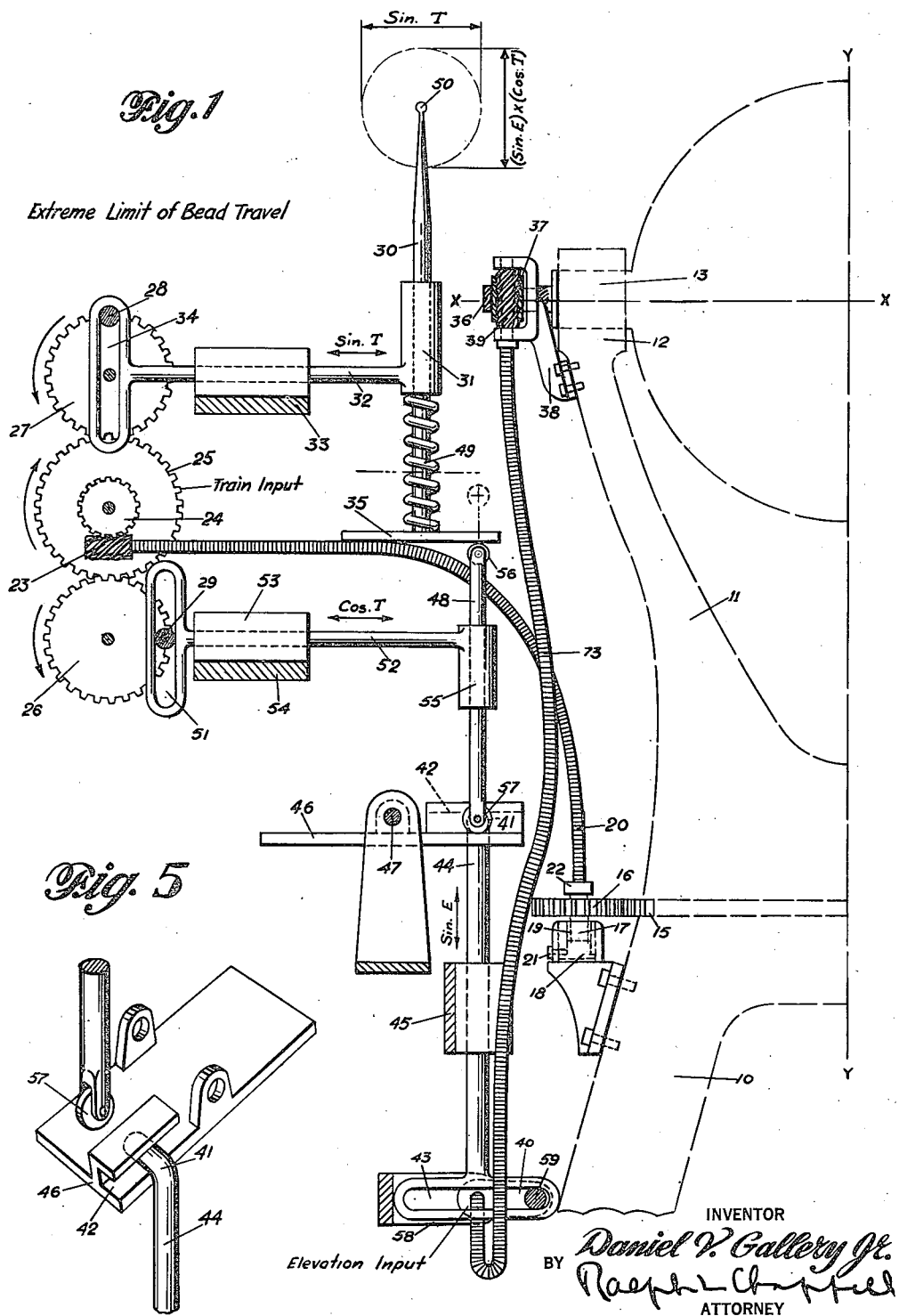
Fig. 1 is a diagrammatic illustration showing mechanical means for offsetting the front bead sight as the gun is moved in elevation and train. For the position of the sight, as illustrated, the gun elevation is zero and the angle of train is zero.
Figure 4:
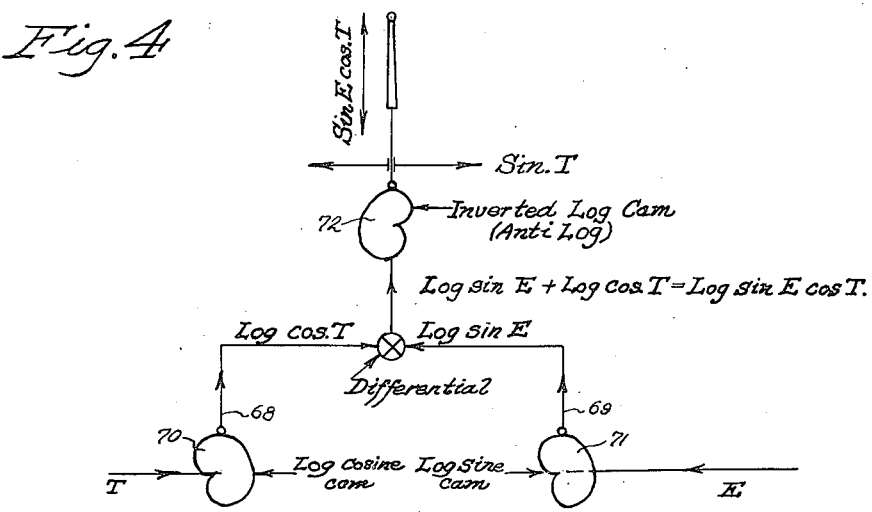

Fig. 4 graphically illustrates a method for offsetting the sighting elements by means of a log cosine and a log sine cam; and Fig. 5 is a perspective view of the tiltable plate and roller of Fig. 1.

Referring to Fig. 1 of the drawing showing a specific means for introducing the proper correction into one of two sighting elements as the gun is moved in elevation and train, the pedestal support for the gun is indicated generally at 10. A yoke member 11 is secured to this pedestal support so as to be rotatable about an azimuthal axis Y—Y to provide for movement in train. Suitable supports 12 for the gun trunnions 13 are provided on this yoke member so that the gun may be rotated about a lateral axis X—X through the trunnions to provide for movement in elevation. A large ring gear 15 is secured to the yoke member 11 to form a driving engagement with a pinion gear 16 keyed to a rotary spindle 17 journaled in a bushing 19 which is seated in the retaining block 18. This block 18 is bolted or otherwise secured to the pedestal 10 and the bushing 19 is preferably formed about the spindle 17 so that when held in place in the retaining block 18 by means of the pin 21, or other means, the spindle will be rotatably secured within the supporting block and will be retained in place irrespective of the position of the aircraft upon which the gun may be mounted. The opposite end of the spindle 17 is provided with a socket connection which is adapted to receive an end of a flexible shaft indicated generally at 20. The collar 22 securely holds the drive shaft to the spindle.

As the gun is moved in train about the azimuthal axis Y—Y, the large ring gear rotates with the gun and drives the pinion gear 16 which is rotatably secured to the block 18. The rotation of the ring gear drives the flexible shaft 20, which is coupled to a worm gear 23 at its opposite end. This worm gear 23 is in mesh with a worm wheel 24 integrally formed or rotatable with the train input wheel 25. The train input wheel may be geared at its outer periphery so as to mesh with the two gear wheels 26 and 27, each of which carry a crank pin 29 and 28 respectively. The ratio between the ring gear 15, pinion gear 16, worm gear 23, and the gear wheels 24 and 25 are selected so that the train crank pins 28 and 29 rotate at a ratio of 1 to 1 with the gun in train.

The adjustable bead sight 50 is fixed to or formed integrally with the upper extremity of the control shaft 30. This shaft extends in a direction parallel to the vertical reference plane but may be moved laterally with respect to the bore of the gun to move the bead sight in a path parallel to the horizontal reference plane and in a direction perpendicular to the axis of the bore. In order that the movement of the bead sight may be a function of the sine of the angle of train, the shaft is slidably held in place within the guideway 31 which is formed on one end of the slide rod 32. The other end of the slide rod has a longitudinal slot 34 formed therein adapted to receive the train crank pin 28. This rod is also supported and slidable in a guide arm 33 which is preferably mounted on or secured to the recoil guide and slide mechanism (not shown). The drawing shows the correct position of the crank pin 28 for zero angle of train, but as the gun is moved in train the bead sight element 50 will be moved either to the left or right, an amount which is the function of the sine of the angle of train. It may be noted that a coil spring 49 is placed about the control shaft 30 between the lower shoulder of the guideway 31 and the horizontal plate 35 secured to the vertical control shaft 30 at its other extremity.

A spiral gear 36 is secured to the trunnion 13 so that its axis is in alignment with the horizontal trunnion axis X—X. As the gun is elevated this gear rotates with the trunnion to drive a spiral idler gear 37 secured to a suitable stub shaft rotatably supported in a bushing formed in the bracket 38 which is bolted to the gun yoke 11. This bracket also carries a bushing rotatably supporting the spindle of the worm gear 39 which is in mesh with the idler gear 37. One end of the spindle is coupled to an end of the flexible shaft 73.

The other end of this flexible shaft 73 is drivingly secured to the crank 40 which is rotatable in a bracket 58 also secured to the recoil guide and slide so as to be movable with the gun in elevation and train. One end of the crank carries a pin 59 adapted to engage a laterally extending slot 43 formed in one end of the slide rod 44. The block 45 has a guideway formed therein to receive the slide rod 44. The block is also supported by the gun so as to be movable therewith. The opposite end of the slide rod 44 is provided with a laterally projecting stud 41 (Fig. 5) movable within a slot 42 formed in the guideway of rocking or inclinable plate 46 which is pivoted at 47. It is noted that the center of the stud 41, the pivot 47 and the axis of the roller 57 must lie in a straight line, therefore the slot 42 is formed on the upper surface of said plate. The size of the gears 36, 37 and 39 are selected so that the crank 40 will rotate at a ratio of 1 to 1 with rotation of the gun in elevation. The drawing shows the correct position of the crank pin 59 for an angle of elevation of 0°.

As the gun is depressed in elevation the crank pin 59 rotates about the axis of the crank moving the slide rod a certain amount which is a function of the sine of the angle of elevation. This movement of the slide rod is transmitted to the bead sight through the plate 46, interconnecting slide rod 48 and the vertical control shaft 30. The bead is thus moved in a path parallel to the vertical reference plane and perpendicular to the axis of the bore and an amount which is a function of the sine of the angle of elevation.

This sight must also be moved in the same path, i. e., in a path parallel to the vertical reference plane and perpendicular to the axis of the bore, an amount which is a function of the cosine of the angle of train. To accomplish this object I have provided a second train crank pin 29 which is adapted to engage a longitudinal slot 51 formed in one end of a slide rod 52 so as to move the slide rod 52 laterally in the guideway 53 of the supporting arm 54. The arm 54 is also preferably mounted on the recoil guide and slide member so as to be movable therewith as the gun is moved in elevation and train.

The end of the slide rod 52 opposite the longitudinal slot 51 is provided with another guideway 55 which slidably supports the interconnecting slide rod 48. Each end of this slide rod is provided with a roller 56 and 57, which rollingly engage the surface of the horizontal plate 35 and the inclinable plate 46, respectively. The spring member 49 is provided so that the vertical control shaft 30 and horizontal plate 35 will accurately follow the movement of the interconnecting slide rod 48 and inclinable plate 46. If the gun is moved in train when elevated to any other angle than 0° or 180° the bead sight will be moved in the vertical path an amount equal to the function of the cosine of the angle of train. The magnitude of the correction introduced is, of course, dependent upon the angle of elevation since the inclination of the inclinable plate 46 governs the magnitude of the correction introduced as the gun is moved in train. The position of the crank pin 29, as shown in the drawing, is correct for an angle of train equal to zero.

It should be noted that if the angle of elevation is zero the bead sight 50 will not be moved in its vertical path as the gun is moved in train because the inclinable plate 46 will then be horizontal. Likewise, if the angle of train is 90° the bead sight will not be moved in its vertical path as the gun is moved in elevation because the center of the roller 57 will be vertically aligned with the axis of the pivot 47. For other positions of train and elevation between 0° and 90° the movement of the bead sight in the vertical path is a function of the product of sine of the angle of elevation and cosine of the angle of train.

Figure 2:
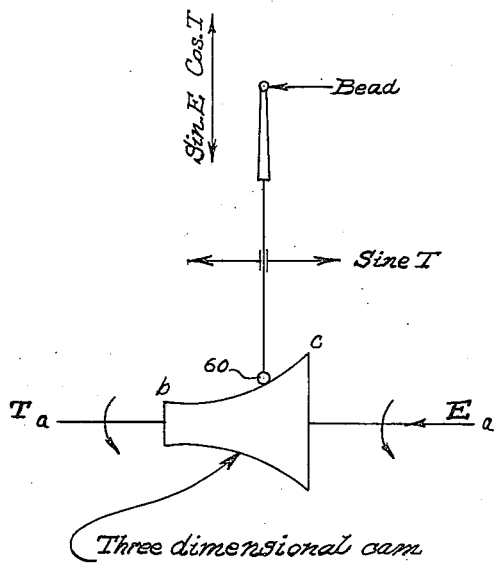
Fig. 2 is a diagrammatic illustration showing a method for offsetting the sighting element by means of a three-dimensional cam.
Figure 3:
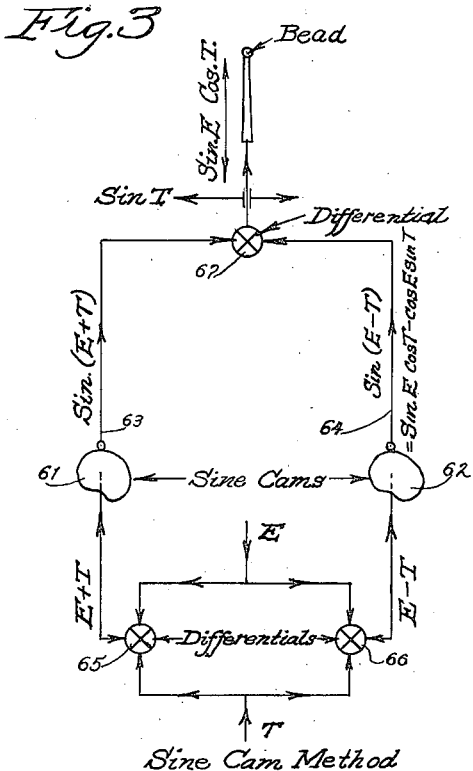
Fig. 3 illustrates diagrammatically a means for offsetting the sighting element by means of two sine cams.

Figs. 2, 3 and 4 diagrammatically illustrate a number of modified methods, any one of which may be used to introduce the proper correction into the bead sight. In each of these various modifications I have not illustrated specifically the method whereby the bead sight may be displaced laterally an amount equivalent to the sine function of the angle of train, since the method proposed and illustrated in Fig. 1 is entirely satisfactory for this purpose. However, since this correction is simply a function of the sine of the angle of train, other equivalently effective means may be used and I do not wish, therefore, to be limited specifically to the exact means disclosed. In each of these views I have graphically illustrated various means whereby the product of the sine angle of elevation and the cosine angle of train function may be accurately obtained.

For example, in Fig. 2 the movement of the bead in its vertical path parallel to the vertical reference plane and normal to the axis of the bore of the gun is effected by means of a three dimensional cam. A follower comprising the frictionless ball 60 is adapted to follow the configuration of the surface of the cam so as to transmit the combined rotary and translatory movement of the cam into translatory movement of the bead within its restricted vertical path. That is, the follower 60 and the bead will assume a definite series of positions along a straight line, which correspond in space to a definite series of positions occupied by the point on the cam surface which is in contact with the follower ball 60.

Rotation of the cam about its axis $a$—$a$ will transmit movement to the bead through the follower 60 which is a function of the cosine of the angle of train. Likewise, translatory movement of the cam along the axis $a$—$a$ will cause a vertical movement of the bead and follower 60 which is a function of the sine of the angle of elevation. Suitable mechanical connections, well known to the art, are provided to rotate the cam at a ratio of 1 to 1 as the gun is moved in train, similarly, other mechanical connections and devices well known in the art are provided to move the cam laterally on its axis $a$—$a$ a distance equivalent to $b$—$c$ for each movement of the gun in elevation through an arc of 90°. This translatory movement of the cam must be directly proportional to the rotary movement of the gun in elevation.

The correct position of the follower 60 for an angular elevation of 90°— and zero angle of train, is the point $c$ indicated on the drawing. The follower 60 in this position transmits the maximum vertical displacement to the bead as the cam surface is rotated in response to movement of the gun in train. When the elevation of the gun is zero and the train is zero the correct position of the follower is at the point $b$ on the drawing. The cam surface is cylindrical at this point so that the bead sight will not be moved along its vertical path as the gun is moved in train. If the gun is trained 90° the component of the air speed of the firing aircraft along the bore or within the vertical plane of the bore is zero. Therefore, when the cam is rotated 90° from the position shown in the drawing to correspond to the position of train equal to 90°, no vertical movement will be transmitted to the bead sight as the gun is moved in elevation, because the cam surface is at this point uniformly spaced from the axis $a$—$a$ throughout the distance $b$—$c$.

If a turret mount is used wherein the gun may be moved in elevation throughout 360°, the cam is merely shuttled back and forth along its axis $a$—$a$, once for each 90° movement in elevation. The particular apparatus for effecting the movement of the cam has not been disclosed, for the sake of simplicity of the drawing and because I am not here concerned with their details which involve only features of mechanical design, well known to the art.

In Fig. 3 I have diagrammatically illustrated a method of introducing the sin. E cos. T function by means of two sine cams 61 and 62. In this modification the movement of the gun in elevation and train is transmitted directly to two differentials 65, 66 so that the output of one (65) is equivalent to the sum of the two movements, while output from the other (66) is equivalent to their difference. That is, the output from differential 66 is equivalent to the movement of the gun in elevation minus the movement of the gun in train. The output from each differential is transmitted directly to one of each of the two sine cams 61, 62. The translatory motion delivered to the follower 63 by the cam 61 is a function of both the sine of the angle of elevation and the sine of the angle of train. The translatory motion transmitted to the follower 64 by the cam 62 is, however, a function of the sine of the angle of elevation—sine of the angle of train or sine $(E-T)$ which is equal to sin. $E$ cos. $T$—cos. $E$ sin. $T$. The translatory motion of each follower 63, 64 is transferred into rotary motion by means of any of a number of mechanical arrangements well known in the art. This rotary motion which is the equivalent of the translatory motion of the two follower members is transmitted to another differential 67, whose output is equivalent to the sum of the two rotary motions imparted thereto, or as expressed algebraically, $$\sin. (E+T) + \sin. (E-T)$$

Since sin. $(E-T)$ = sin. $E$ cos. $T$ — cos. $E$ sin. $T$, and since sin. $(E+T)$ = sin. $E$ cos. $T$ + cos. $E$ sin. $T$, the sum of the two motions imparted to the differential is equivalent to 2 sin. $E$ cos. $T$ or the function of the sine of the angle of elevation multiplied by the cosine of the angle of train.

In Fig. 4 I have illustrated a further modification of my invention, wherein the proper correction to the bead is introduced by means of two log cams 70—71 and an anti-log cam 72. In this modification the movement of the gear in train is transmitted directly to the log cosine cam 70 so that the cam will rotate at a ratio of 1 to 1 with the gun in train. The movements of the gun in elevation is transmitted directly to a log sine cam 71 which rotates with the gun at a ratio of 1 to 1. The rotary movement of each cam is transmitted into translatory movement by means of the followers 68—69. Movement of follower 68 is equivalent to a function of the log cosine angle of train, and the translatory movement of the follower 69 is equivalent to a function of the log sine angle of elevation. The translatory movement of each follower is transformed into an equivalent rotary movement by means of apparatus well known to the art and this rotary movement is transmitted directly to a differential whose output would be equivalent to the sum of the log sine angle of elevation log cosine angle of train or log sine $E$ cos. $T$. This rotary movement is transmitted to an anti-log cam 72 whose output in translatory movement is equivalent to a function of the product of sine angle of elevation and cosine angle of train. This is the proper vertical compensation which must be introduced into the movement of the bead.

It will be apparent to those skilled in the art that while I have disclosed my invention with reference to a bead sight, the invention is not so limited, since obviously other equally useful sighting elements may be used. Furthermore, it should be understood that I do not propose to be limited specifically to the type of gun mounting illustrated in Fig. 1. In fact, it is to be expressly understood that the present invention is not limited to any specfic means disclosed herein or otherwise than by the appended claims.

The invention described herein may be manufactured and used by or for the Government of the United States of America for governmental purposes without the payment of any royalties thereon or therefor.

I claim:

1. A gun movable about elevational and azimuthal axes and having a movable sighting element, in combination, a pair of confronting plates, a pivotal mount for one of the plates and a structure at one of its sides defining a slot, a system of axially parallel rods, one of the rods carrying the sighting element and engaging the other plate, a second rod having roller contact with the confronting surfaces of the plates, a third rod having a lateral stud riding in the slot structure to accommodate rocking of said one plate, a gear train and means for setting it in operation by the training of the gun in azimuth, crank operated connections between selected gears of the train and the first and second rods for producing a lateral shift of said first and second rods and said other plate, and a terminal crank device for the third rod, being operative by elevation of the gun for producing a unitary axial shift of the three rods accompanied by rocking of the pivoted plate and an axial movement of the remaining plate.

2. A gun movable about elevational and azimuthal axes and having a movable sighting element, in combination, a pair of confronting plates, a pivotal mount for one of the plates and a structure at one of its sides defining a slot, a system of axially parallel rods, one of the rods carrying the sighting element and engaging the other plate, a second rod having roller contact with the confronting surfaces of the plates, a third rod having a lateral stud riding in the slot structure to accommodate rocking of said one plate, a gear train and means for setting it in operation by the training of the gun in azimuth, crank operated connections between selected gears of the train and the first and second rods, said crank connections including guideway terminals slidably containing the first and second rods for producing a lateral shift of said first and second rods and said other plate, a terminal crank device for the third rod, being operative by elevation of the gun for producing a unitary axial shift of the three rods accompanied by rocking of the pivoted plate and an axial movement of the remaining plate, and a spring between one of the guideway terminals and the plate of the first rod, establishing a unidirectional pressure in the rod system and the confronting plates to the terminal crank device.

DANIEL V. GALLERY, Jr.

REFERENCES CITED

The following references are of record in the file of this patent:

UNITED STATES PATENTS

| Number | Name | Date |
|---|---|---|
| 1,650,628 | Inglis | Nov. 29, 1927 |
| 1,935,615 | Coupland | Nov. 21, 1933 |
| 2,183,530 | Alkan | Dec. 19, 1939 |
| 2,466,093 | Ford | Apr. 5, 1949 |